(12) United States Patent
Yamada et al.

(10) Patent No.: US 6,332,701 B1
(45) Date of Patent: Dec. 25, 2001

(54) VEHICLE LAMP

(75) Inventors: Tetsuo Yamada, Kanagawa; Hisashi Ohmachi, Tokyo, both of (JP)

(73) Assignee: Stanley Electric Company, Tokyo (JP)

( * ) Notice: Subject to any disclaimer, the term of this patent is extended or adjusted under 35 U.S.C. 154(b) by 0 days.

(21) Appl. No.: 09/455,396

(22) Filed: Dec. 6, 1999

(30) Foreign Application Priority Data

Dec. 18, 1998 (JP) .................................................. 10-360866

(51) Int. Cl.[7] ....................................................... F21V 7/00
(52) U.S. Cl. ........................... 362/517; 362/543; 362/545; 362/540; 362/298; 362/304; 362/305; 362/241; 362/247; 362/237; 362/238; 362/342
(58) Field of Search ..................................... 362/543, 544, 362/545, 517, 540, 297, 346, 308, 332, 335, 241, 247, 245, 298, 299, 342, 304, 305, 237, 238

(56) References Cited

U.S. PATENT DOCUMENTS 1,814,669 * 7/1931 Cushing ................................ 362/297
5,582,480 * 12/1996 Zwick et al. ......................... 362/298
5,877,682 * 3/1999 Groeller ................................ 340/479
6,096,549 * 8/2000 Jenkins et al. ....................... 359/726

FOREIGN PATENT DOCUMENTS 2-4401   2/1990 (JP) .
2-4405   2/1990 (JP) .

* cited by examiner

Primary Examiner—Thomas M. Sember
Assistant Examiner—Ali Alavi
(74) Attorney, Agent, or Firm—Morgan, Lewis & Bockius LLP

(57) ABSTRACT

A vehicle lamp is disclosed that includes plural light sources located on a printed wiring board. A first reflection structure reflects light from the light sources to a light emitting surface, and a second reflection structure reflects light reflected from the first reflection structure in an illuminating direction of the vehicle lamp. The construction of the lamp's first and the second reflection structures permits the light emitting surface of the vehicle lamp to shine uniformly. Accordingly, the number of the light sources required is minimized.

20 Claims, 2 Drawing Sheets

VEHICLE LAMP

This invention claims the benefit of Japanese Patent Application No. HEI10-360866, filed on Dec. 18, 1998, which is hereby incorporated by reference.

BACKGROUND OF THE INVENTION

1. Field of the Invention

The invention relates to a vehicle lamp used as a tail lamp or the like in which a signal is produced. More particularly, the invention relates to vehicle lamps which use several light sources, for example LED lamps or the like, each of which require a small amount of electric power.

2. Discussion of the Related Art

FIG. 5 illustrates a conventional automobile lamp 90 with a light source including several LED lamps 91. The LED lamps 91 are mounted on a printed wiring board 92 and are enclosed in a housing 93. The light emitting direction of the LED lamps 91 corresponds to the illuminating direction of the automobile lamp 90. The LED lamps 91 are covered by an outer lens 94 which has lens cut 94a on the inner surface of the outer lens 94.

The light rays produced by the LED lamps 91 are beam-formed luminous fluxes. The area of the outer lens 94 which is illuminated by a single LED lamp 91 is comparatively small. Accordingly, a plurality of LED lamps 91 are required to realize a uniformly lit surface for the outer lens 94.

In some instances the outer lens 94 is curved to fit the design of an automobile body and the distance between the LED lamps 91 and outer lens 94 differs with respect to each other. The difference in distance between the LED lamps 91 and outer lens 94 is due to the mounting configuration of the lamps 91 on the surface of a printed wiring board 92. Accordingly the size of the areas and the distance between the areas of the outer lens 94 illuminated by the LED lamps 91 is different with respect to each other. The printed wiring boards 92 can be attached in the automobile lamp 90 such that they form a broken line form or can be stacked in a stair configuration for mounting the LED lamps 91 at a uniform distance with respect to the outer lens 94.

The large number of LED lamps 91 required for the conventional automobile lamp 90 creates high manufacturing costs. Since the light illuminated by a LED lamp 91 is in a beam formation, the illuminated area of the outer lens 94 is narrow. Accordingly, in order to uniformly illuminate the outer lens 94, a plurality of LED lamps 91 are required. The large number of LED lamps 91 increases both the manufacturing and final product costs.

When the surface of the outer lens 94 has curved lines, the disposition of the printed wiring board 92 is difficult to determine. Accordingly, the position of the printed wiring board 92 with respect to the inner side of the outer lens 94 is not uniform, and the light distribution patterns of the lamps 90 may be different with respect to each other. Furthermore, the quality of the automobile lamp 90 may decrease and may not meet the requirements for each of the light distribution patterns due to the wiring board configuration.

SUMMARY OF THE INVENTION

The invention is directed to a vehicle lamp that substantially obviates one or more of the above problems due to the limitations and disadvantages of conventional vehicle lamps.

According to the invention, the above objects are achieved by providing a vehicle lamp having an illuminating direction, including a housing, an outer lens located adjacent the housing and including a light emitting surface, a plurality of lamps located in the housing, a first reflection structure located such that the first reflection structure is capable of reflecting light from the plurality of lamps to the light emitting surface, and a second reflection structure located such that the second reflection structure is capable of reflecting the light reflected by the first reflection structure to the illuminating direction of the vehicle lamp.

In accordance with another aspect of the invention, a vehicle lamp having an illuminating direction can be provided that includes a housing, an outer lens located adjacent the housing and including a light emitting portion, a plurality of lamps located in the housing, a first reflection structure located such that the first reflection structure is capable of reflecting the light from the plurality of lamps to the light emitting portion, and a second reflection structure including reflection cuts and located such that the second reflection structure is capable of reflecting the light reflected by the first reflection structure to the illuminating direction of the vehicle lamp.

BRIEF DESCRIPTION OF THE DRAWINGS

The accompanying drawings, which are included to provide a further understanding of the invention and are incorporated in and constitute a part of this specification, illustrate embodiments of the invention and together with the description serve to describe the principles of the invention.

DETAILED DESCRIPTION OF PREFERRED EMBODIMENTS

Figure 1:
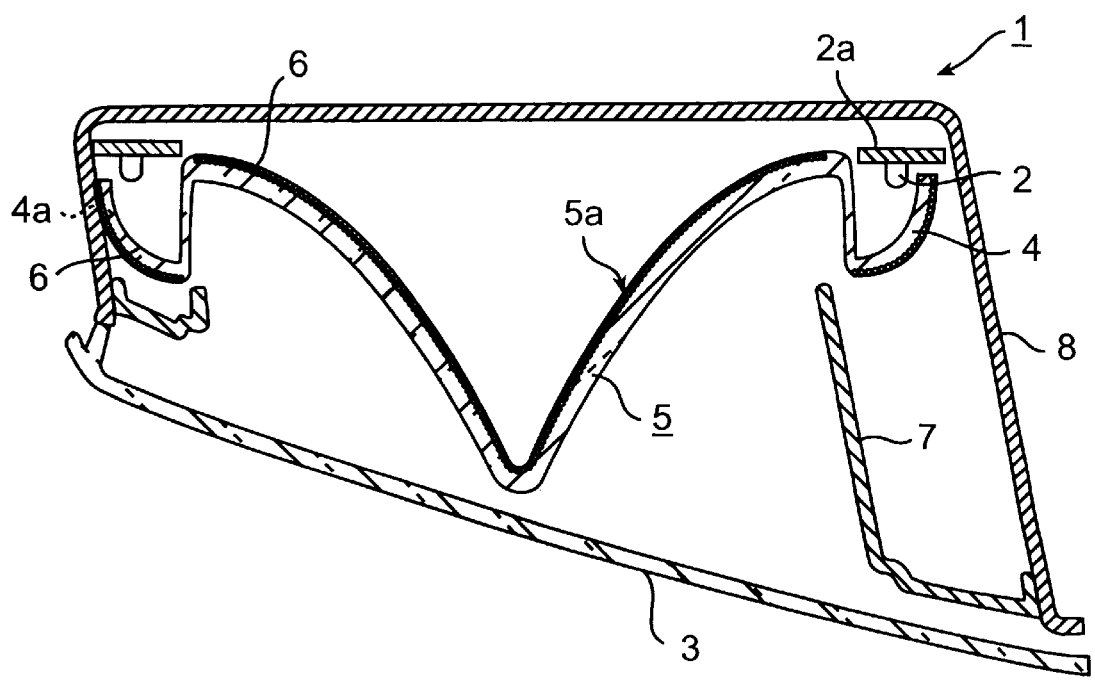
FIG. 1 is a cross-sectional view of a vehicle lamp according to a preferred embodiment of the invention.
Figure 2:
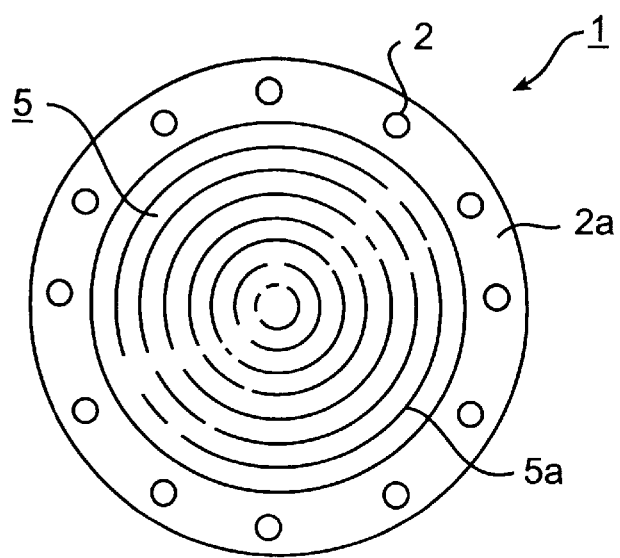
FIG. 2 is a front-view of the lamp shown in FIG. 1 without an extension structure.

Preferred embodiments of the invention will be described with reference to the drawings. A vehicle lamp 1 of the invention is shown in FIGS. 1 and 2. The vehicle lamp 1 in FIGS. 1 and 2 includes a plurality of LED lamps 2 or the like, which require comparatively small electric power for a vehicle lamp.

In the embodiment of FIG. 1, a first reflection structure 4 and a second reflection structure 5 are formed in the vehicle lamp 1. The LED lamps 2 are mounted on the printed wiring board 2a. The number of LED lamps 2 is determined by the amount that meets the requirement for the brightness of the vehicle lamp 1. The lamps 2 can be disposed with a constant interval along a circumference of a circular printed wiring board 2a.

The direction of the LED lamps 2 mounted on the printed wiring board 2a is uniform in order to facilitate the manufacturing process. For example, the bottoms of the LED lamps can be attached such that they are very close to the printed wiring board 2a. In addition, the number of LED lamps 2 is selected to give the appropriate brightness to the vehicle lamp 1.

The first reflection structure 4 covering the emitting side of the LED lamps 2 is attached to the printed wiring board 2a on which the LED lamps 2 are mounted. Preferably, the second reflection structure 5 protrudes from the center portion of the doughnut shaped printed wiring board 2a. The first reflection structure 4 faces the second reflection structure 5.

A desirable method of forming the first and the second reflection structures 4 and 5 is to mold both structures 4 and 5 into a body of transparent material or the like and to mount a reflection film 6 on appropriate portions to form the reflection structures 4 and 5 by metallic vacuum deposition or the like.

In order to provide a specific reflection quality, both reflection structures 4 and 5 can include diffusing cut surfaces 4a and 5a formed on appropriate portions of the reflection structures 4 and 5. Accordingly light from LED lamps 2 is uniformly reflected in the illuminating direction of the vehicle lamp.

The vehicle lamp 1 can include a first reflection structure 4, a second reflection structure 5 and LED lamps 2 mounted on the printed wiring board 2a. In addition, the lamp 1 can include an extension 7 for appearance, an outer lens 3 covering the front portion of the lamp 1 in the illuminating direction, and a housing 8 encasing the lamp 1 with the outer lens 3.

When a specific light distribution pattern is realized by forming diffusing cuts 4a and 5a on one or both of the first and second reflection structures 4 and 5, lens cuts may not be required on the outer lens 3. Accordingly, when viewing the vehicle lamp from outside of the lamp 1, the design of the second reflection structure 5 is visible and can provide a strong aesthetic impression.

The improved function and efficiency of the vehicle lamp of the invention are now discussed. First, the lights from the LED lamps 2 are diffused and directed to the illuminating angle by the first and second reflection structures 4 and 5. Accordingly, the light from the LED lamps 2 can be diffused to illuminate a large distance and area, and the number of LED lamp 2 can be minimized while maintaining appropriate brightness for the vehicle lamp 1.

Second, the beam-formed light from the LED lamps 2 shines in the illuminating direction of the vehicle lamp 1. The light is reflected by the first and second reflection structures 4 and 5 which have an appropriate diffusing function. Since the light from the LED lamps 2 is appropriately diffused, the vehicle lamp 1 is uniformly bright, distinguishing it from the conventional automobile lamp 90.

Figure 3:
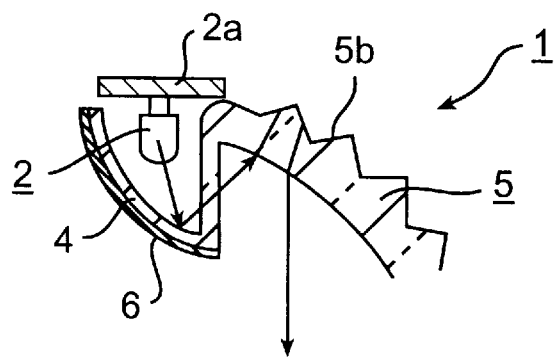
FIG. 3 is a cross-sectional view of a vehicle lamp according to another preferred embodiment of the invention.

FIG. 3 depicts another preferred embodiment of the invention. The second reflection structure 5 in the embodiment of FIG. 1 has diffusing cuts 5a similar to those of the first reflection structure 4. However in the embodiment of FIG. 3, in place of diffusing cuts 5a, reflection cuts 5b are made in the second reflection structure 5 which entirely reflect light by using a high refractive index for the material. Reflection cuts can be approximately 90 degree cuts made in the back surface of the reflection structure 5 such that light rays are substantially reflected back from the angled reflection surfaces as shown in FIG. 3. Accordingly, the second reflection structure 5 functions appropriately to reflect light without requiring reflection film 6.

The second reflection structure 5 may not be colored with silver or the like. Accordingly, the appearance of the vehicle lamp 1 depends on the observation angle at which the vehicle lamp 1 is viewed. The vehicle lamp 1 can look as if it is entirely reflective from one angle and can look transparent from another angle. These innovative appearances for the vehicle lamp 1 provide improved aesthetic qualities.

Figure 4:
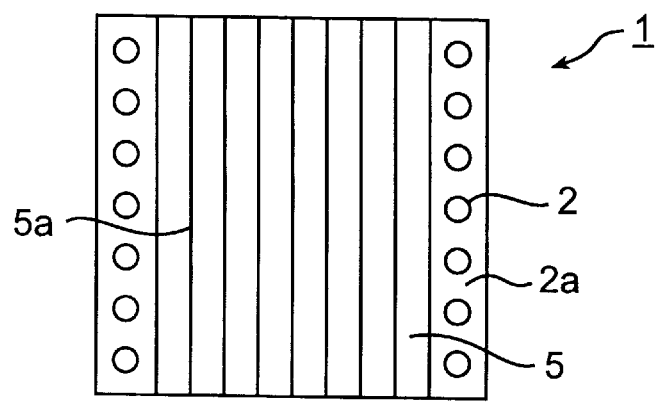
FIG. 4 is a front-view of the vehicle lamp shown in FIG. 3.
Figure 5:
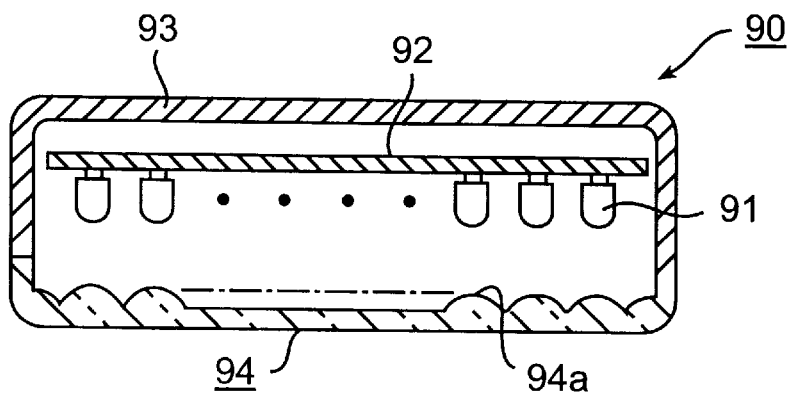
FIG. 5 is a cross-sectional view of a conventional vehicle lamp.

FIG. 4 illustrates yet another preferred embodiment of the invention. Vehicle lamp 1 in FIG. 2 has a printed wiring board 2a on which the LED lamps 2 are mounted. The printed wiring board 2a is doughnut shaped as shown in FIG. 2. However, in the embodiment of FIG. 4, the printed wiring board 2a can be in the form of rectangles disposed on both sides of the second reflection structure 5. The printed wiring board 2a can also be various shapes other than doughnut shaped or rectangular shaped. For example, four polygonal, rectangular, square, octogonal or the like printed wiring boards 2a can be disposed around the second reflection structure 5. Since the cross sectional view of the vehicle lamp 1 in the embodiment of FIG. 4 is similar to that shown in FIG. 1, the cross-sectional view of the embodiment of FIG. 4 is not shown. The embodiment of FIG. 4 provides different qualities for the front view of the lamp. For example, a lamp of the embodiment shown in FIG. 4 can be made shorter and less wide than the doughnut shaped lamp shown in FIG. 1.

The vehicle lamp 1 of the invention can include a plurality of LED lamps 2 located on a printed wiring board 2a. A first reflection structure 4 which reflects light from the light sources 2 to a light emitting surface of the vehicle lamp 1, and a second reflection structure 5 which reflects light from the first reflection structure 4 to an illuminating direction of the vehicle lamp 1 can be provided. Accordingly, the number of LED lamps required for illuminating the entire light emitting surface can be minimized while using LED lamps 2 whose illuminating angle is narrow. The vehicle lamp 1 of the invention is efficient, consumes little electric power, is produced and manufactured at low cost, and performs better than conventional lamps.

In addition, by having the light from LED lamps 2 (which have a narrow illuminating angle) pass through the first and second reflection structures 4 and 5, the illuminating direction of the vehicle lamp 1 is enlarged. Since first and second reflection structures 4 and 5 have appropriate diffusing characteristics, the illuminating angle of the LED lamps 2 can be enlarged. Accordingly the light from the light emitting surface of the vehicle lamp 1 is uniform, and the vehicle lamp 1 using LED lamps 2 for light sources can perform with great efficiency.

What is claimed is:

1. A vehicle lamp having an illuminating direction, comprising:
    a housing;
    an outer lens located adjacent said housing and including a light emitting surface;
    a plurality of lamps located at a periphery of said housing;
    a first reflection structure located such that said first reflection structure is capable of reflecting light from said plurality of lamps to said light emitting surface; and
    a second reflection structure located such that said second reflection structure is capable of reflecting the light reflected by said first reflection structure to the illuminating direction of said vehicle lamp.

2. The vehicle lamp of claim 1, wherein said plurality of lamps are mounted on a doughnut shaped printed wiring board.

3. The vehicle lamp of claim 1, wherein said first reflection structure has a center portion and said second reflection structure protrudes from the center portion of said first reflection structure.

4. The vehicle lamp of claim 1, wherein said first reflection structure and said second reflection structure comprise a transparent material.

5. The vehicle lamp of claim 1, wherein a portion of at least one of said first reflection structure and said second reflection structure includes a film of metallic vacuum deposition.

6. The vehicle lamp of claim 1, wherein at least one of said first reflection structure and said second reflection structure includes light diffusing cuts.

7. A vehicle lamp having an illuminating direction, comprising:
   a housing;
   an outer lens located adjacent said housing and including a light emitting portion;
   a plurality of lamps located at a periphery of said housing;
   a first reflection structure located such that said first reflection structure is capable of reflecting the light from said plurality of lamps to said light emitting portion; and
   a second reflection structure including reflection cuts and located such that said second reflection structure is capable of reflecting the light reflected by said first reflection structure to the illuminating direction of said vehicle lamp.

8. The vehicle lamp of claim 7, wherein said reflection cuts of said second reflection structure reflect light from said plurality of lamps without use of reflection film.

9. The vehicle lamp of claim 1, wherein said plurality of lamps are mounted on two rectangular shaped printed wiring boards disposed on ends of said second reflection structure.

10. The vehicle lamp of claim 1, wherein said plurality of lamps are mounted on four rectangular shaped printed wiring boards which are disposed about said second reflection structure.

11. The vehicle lamp of claim 1, wherein said first reflection structure is configured as a surface.

12. The vehicle lamp of claim 1, wherein said second reflection structure is configured as a surface.

13. The vehicle lamp of claim 7, wherein said first reflection structure is configured as a surface.

14. The vehicle lamp of claim 7, wherein said second reflection structure is configured as a surface.

15. The vehicle lamp of claim 7, wherein said second reflection structure includes a first surface, a second surface, and reflection cuts covering substantially all of said first surface.

16. The vehicle lamp of claim 7, wherein said plurality of lamps are mounted on a doughnut shaped printed wiring board.

17. The vehicle lamp of claim 7, wherein said first reflection structure has a center portion and said second reflection structure protrudes from the center portion of said first reflection structure.

18. The vehicle lamp of claim 7, wherein said first reflection structure and said second reflection structure comprise a transparent material.

19. The vehicle lamp of claim 1, wherein said second reflection structure is substantially V-shaped in cross-section.

20. The vehicle lamp of claim 1, wherein said first reflection structure is located at an outer periphery of said second reflection structure.

* * * * *